(12) United States Patent
Kim et al.

(10) Patent No.: US 6,462,800 B1
(45) Date of Patent: Oct. 8, 2002

(54) ELECTRODE CONTACT STRUCTURE FOR A LIQUID CRYSTAL DISPLAY DEVICE AND MANUFACTURING METHOD THEREOF

(75) Inventors: Hyang Yul Kim, Kyoungki-do; In Cheol Park, Seoul; Seung Hee Lee, Kyoungki-do, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 66 days.

(21) Appl. No.: 09/607,576

(22) Filed: Jun. 29, 2000

(30) Foreign Application Priority Data

Jun. 30, 1999 (KR) ............................................ 99-25662

(51) Int. Cl.[7] ...................... G02F 1/136; G02F 1/1343; G02F 1/1333
(52) U.S. Cl. ...................... 349/143; 349/43; 349/141; 349/159
(58) Field of Search ................................. 349/141, 143, 349/43, 159

(56) References Cited

U.S. PATENT DOCUMENTS

| | | | |
|---|---|---|---|
| 4,542,960 A | | 9/1985 | Yang |
| 4,643,533 A | | 2/1987 | Armitage |
| 4,969,718 A | * | 11/1990 | Noguchi et al. |
| 5,308,264 A | | 5/1994 | Lien et al. |
| 5,576,862 A | | 11/1996 | Sugiyama et al. |
| 5,959,708 A | | 9/1999 | Lee et al. |
| 5,995,174 A | * | 11/1999 | Ukita |
| 6,177,970 B1 | * | 1/2001 | Kim |

FOREIGN PATENT DOCUMENTS

| | | |
|---|---|---|
| JP | 55128922 | 10/1980 |
| JP | 57069281 | 4/1982 |
| JP | 58083478 | 5/1983 |
| JP | 60017419 | 1/1985 |
| JP | 60222825 | 11/1985 |
| JP | 02071616 | 3/1990 |
| JP | 11167120 | 6/1999 |
| JP | 11282427 | 10/1999 |

* cited by examiner

Primary Examiner—William L. Sikes
Assistant Examiner—Julie Ngo
(74) Attorney, Agent, or Firm—Ladas & Parry

(57) ABSTRACT

A liquid crystal display device, and a manufacturing method thereof, having an existing box-like counter electrode connected to the source/drain electrode through a first contact hole in the gate insulating film and so is used as the pixel electrode, and the existing slit-shaped counter electrode is connected to the non-transparent metallic common bus line through a second contact hole in the gate insulating film and so becomes the counter electrode while maintaining the existing process layer structure as it is, so that even if a short circuit occurs between the gate bus line and the pixel electrode in the same layer due to the particle, degradation is limited to only one pixel, which results in enhancing of the process yield.

7 Claims, 5 Drawing Sheets

B-B'

A-A'

B-B'

ELECTRODE CONTACT STRUCTURE FOR A LIQUID CRYSTAL DISPLAY DEVICE AND MANUFACTURING METHOD THEREOF

BACKGROUND OF THE INVENTION

1. Field of the Invention

The present invention relates to a liquid crystal display device and a method for manufacturing the same, and more particularly to a liquid crystal display device and its manufacturing method capable of reducing line degradation due to a short circuit between a gate bus line and a counter electrode, thereby enhancing a process yield.

2. Description of the Related Art

Generally, a liquid crystal display device is composed of a lower substrate provided with a TFT and a pixel electrode, an upper substrate opposed to the lower substrate and having a color filter, and a liquid crystal layer interposed between the lower and the upper substrate. In addition, spacers are distributed in the liquid crystal layer for maintaining a fixed distance between the lower and the upper substrate.

FIG. 1 shows the lower substrate having a conventional FFS (Fringe Field Switching) mode structure in a plan view.

Referring to the figure, a gate bus line 2 and a data bus line 4 are arranged on the lower substrate 1 while crossing over each other so as to define an unit pixel, and a thin film transistor (TFT) is disposed adjacent to an intersection point of the gate bus line 2 and the data bus line 4.

A counter electrode 5 is a transparent conductor formed in each unit pixel. This counter electrode 5 includes a plurality of branches 5a disposed in an equal spacing, and a body portion 5b connected to one end of each branch 5a and joining its own counter electrode 5 to the counter electrode 5 of the adjacent pixel. In this case, a common signal is applied to the counter electrodes 5.

A pixel electrode 7 is formed in each unit pixel region in such a manner that it overlaps the counter electrode 5. The pixel electrode 7 includes a plurality of comb portions 7a, each extending parallel to the data bus line 4 and inserted between the branches 5a, and a bar 7b connected to one end of each comb portion 7a and contacting with a drain electrode of the thin film transistor (TFT). The pixel electrode 7 is also made of a transparent conductor. Further, the counter electrode 7 and the pixel electrode 7 are insulated from each other by interposing a gate insulating film therebetween.

On the other hand, an upper substrate (not shown) is opposed to the lower substrate 1 at a distance larger than that between the comb portion 7a of the pixel electrode 7 and the branch 5a of the counter electrode 5, which is not shown in FIG. 1. In addition, a liquid crystal layer having a plurality of liquid crystal molecules is disposed between the lower substrate 1 and the upper substrate.

The liquid crystal display device of the above-mentioned structure having a high aperture ratio and a high transmittance is operated as follows.

When a voltage is applied between the counter electrode 5 and the pixel electrode 7, a fringe field E including a vertical component is formed between both electrodes 5, 7 because the distance between both electrodes 5, 7 is larger than the distance between the lower and the upper electrode. This fringe field E has an effect on the whole upper area of the counter electrode 5 and the pixel electrode 7, so that all of the liquid crystal molecules in the upper area of the electrodes 5, 7 are operated. Therefore, the high aperture ratio and the high transmittance can be realized.

In the liquid crystal display device having the FFS mode structure which is one of high transmitting-wide visual field angle techniques, the counter electrode 5 is formed by ITO (indium tin oxide) and then the gate bus line 2 and the common bus line 6 are formed by a gate metal of an aluminum (Al) series suitable for a larger area in order to prevent corrosion caused by etching of the ITO during a manufacturing process of the lower substrate.

Nevertheless, the so constructed conventional liquid crystal display device has a drawback that since all of the counter electrodes 5 are connected to the common bus line 6 and constructed in the same layer as the gate bus line 2, a short circuit is apt to occur between the gate bus line 2 and the counter electrode 5 when a particle 10 happens to be generated as shown in FIG. 1B. Thus, even if any one portion is short circuited due to the particle 10, a 'high' voltage is always applied to the gate bus line 2 to cause a defect of the gate bus line 2. This leads to a problem that a process yield for the FFS mode structure is lower by 20% than that for a Twisted Nematic (TN) mode structure.

SUMMARY OF THE INVENTION

Accordingly, the present invention has been made to solve the above-mentioned problems occurring in the prior art, and it is an object of the present invention to provide a liquid crystal display device and its manufacturing method, which limit degradation to only one pixel while maintaining a existing process layer structure as it is even if a short circuit occurs between the gate bus line and the pixel electrode in the same layer due to the particle, thereby increasing the process yield.

To achieve the objective, there is provided a liquid crystal display device in accordance with one aspect of the present invention, the liquid crystal display device comprising a plurality of unit pixels, each unit pixel comprising:

a pixel electrode formed in the shape of a plate on a lower substrate by patterning of a first transparent electrode and protruding at its lower end so as to be contacted with one terminal of a thin film transistor;

a common bus line spaced at a predetermined distance from the pixel electrode;

a gate bus line formed on the opposite side of the common bus line with regard to the pixel electrode;

a counter electrode formed over the pixel electrode by using a slit-shaped second transparent electrode and provided with a first contact hole so as to be connected to the lower common bus line; and a data bus line intersecting with the gate bus line between two pixel electrodes in the adjacent unit pixel and provided with a second contact hole so as to be connected to the lower pixel electrode.

In the liquid crystal display device according to present invention, a size of the first contact hole is preferably 10×30 μm.

Also, it is preferred that a size of the second contact hole is 6×20 μm.

In the liquid crystal display device according to the present invention, a thickness of the pixel electrode is preferably 400 Å.

Preferably, a distance between the common bus line and the pixel electrode is 5 μm.

In the liquid crystal display device according to the present invention, it is preferred that the data bus line is composed of a laminate of molybdenum (Mo)/aluminum (Al)/molybdenum (Mo).

Furthermore, to achieve the above-mentioned objective, there is provided a method for manufacturing a liquid crystal display device in accordance with another aspect of the present invention, the method comprising the steps of:

forming a pixel electrode on a lower substrate by patterning a first transparent electrode, the pixel having the shape of a plate and protruding at its lower end so as to be contacted with one terminal of a thin film transistor;

forming a common bus line spaced at a predetermined distance from the pixel electrode and then forming a gate bus line;

performing a vapor deposition of a gate insulating film on the gate bus line and then patterning the gate insulating film;

performing a vapor deposition of four layers on the gate bus line and then forming an etch stopper layer and an active layer by patterning;

forming a counter electrode over the pixel electrode by using a slit-shaped second transparent electrode and then providing the counter electrode with a contact hole for connecting the counter electrode with the common bus line;

forming a data bus line in such a manner that it intersects with the gate bus line, forming a source/drain electrode and then providing the source/drain electrode with a second contact hole for connecting the source/drain electrode to the lower pixel electrode; and coating a protective film on the resultant product and then opening the productive film by patterning for the preparation of a leader-bonding operation.

BRIEF DESCRIPTION OF THE DRAWINGS

The above objectives, and other features and advantages of the present invention will become more apparent after a reading of the following detailed description when taken in conjunction with the drawings, in which.

DETAILED DESCRIPTION OF PREFERRED EMBODIMENTS

Hereinafter, a preferred embodiment of the present invention will be described with reference to the accompanying drawings. In the following description and all drawings, the similar parts having the same function will be designated by the similar numerals, and so repetition of the description on the same parts will be omitted.

Figure 1A:
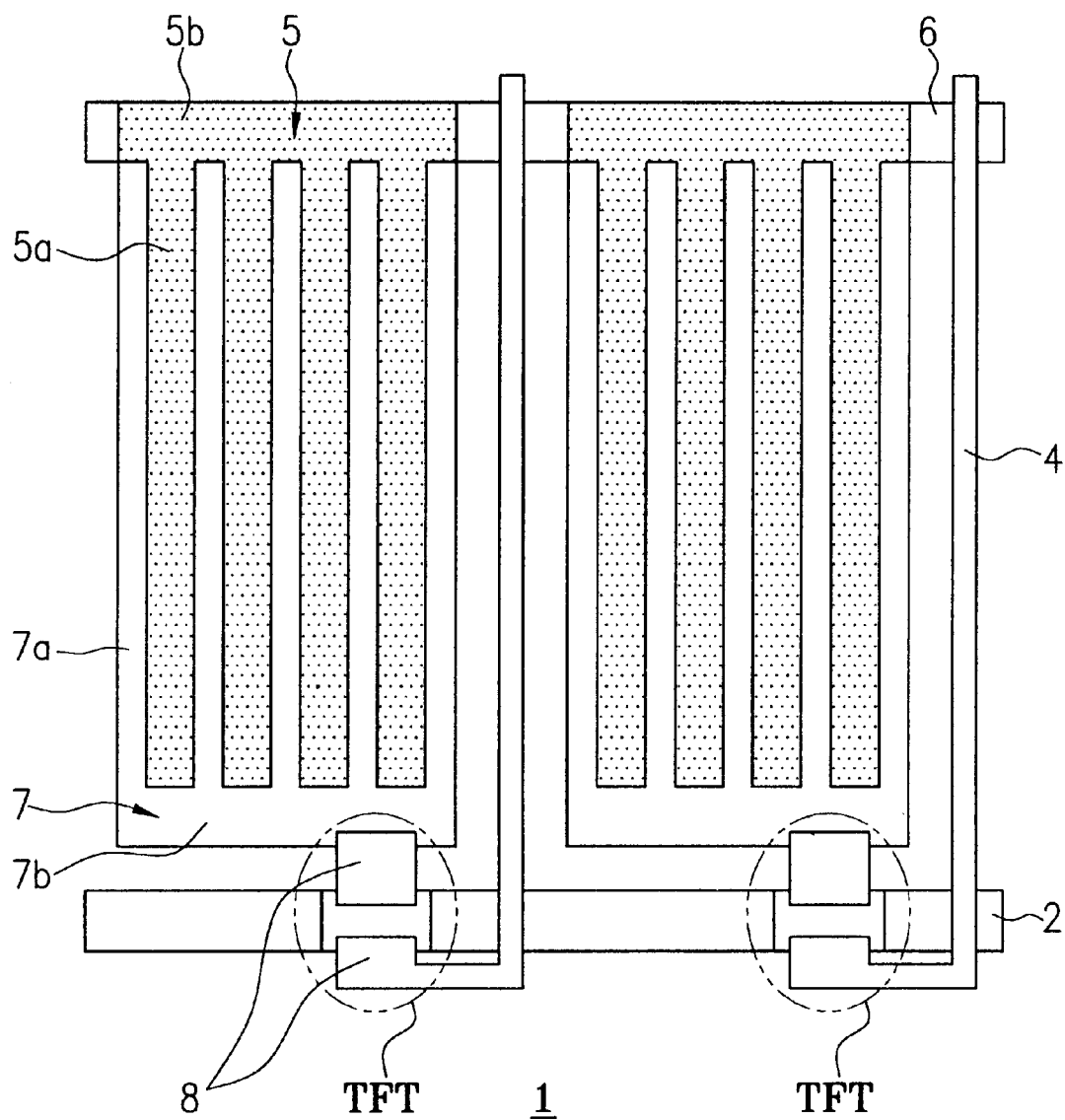
FIG. 1 is a plan view of a lower substrate of a conventional liquid crystal display device having a FFS mode structure.
Figure 1B:
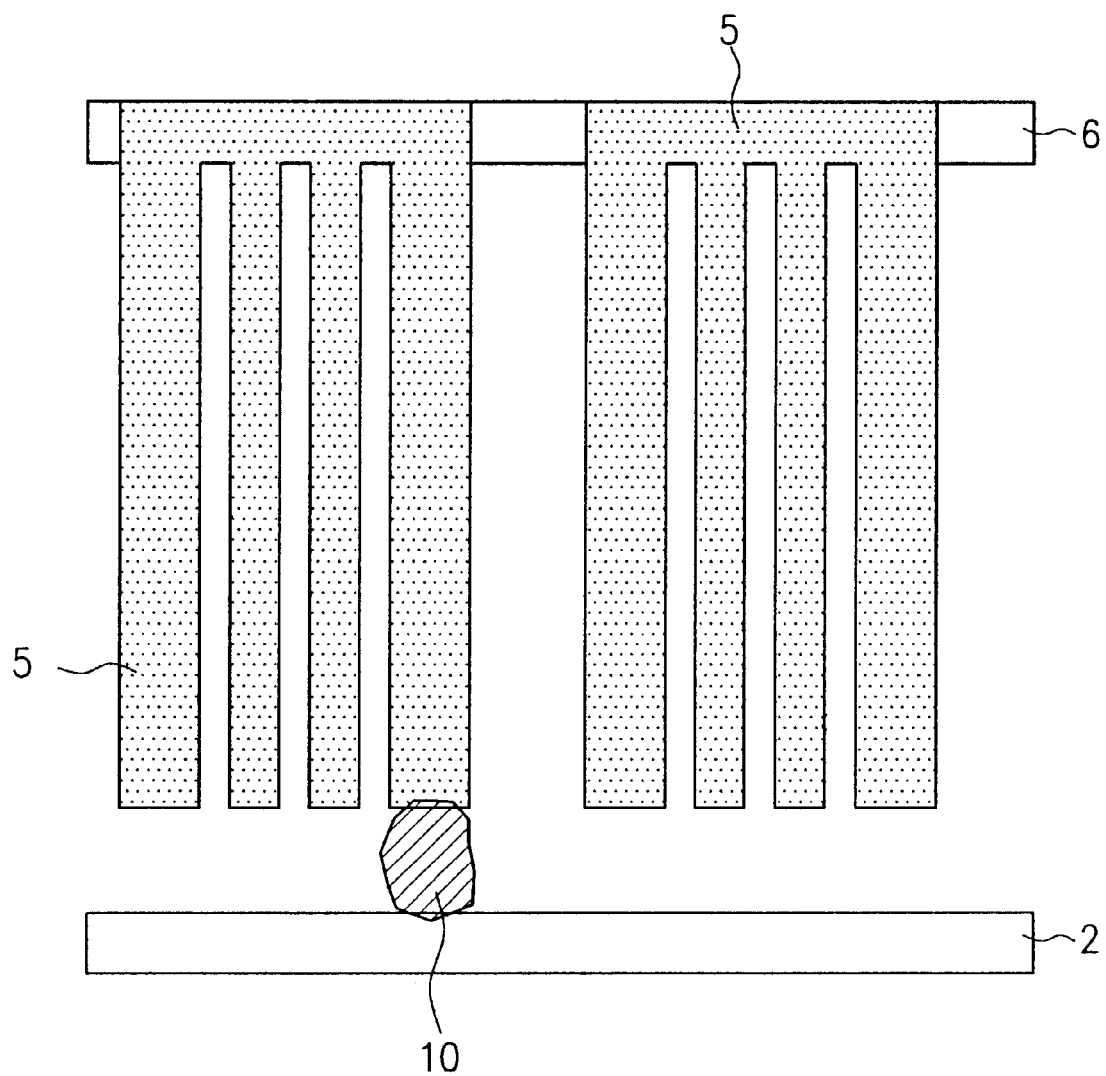
Figure 2A:
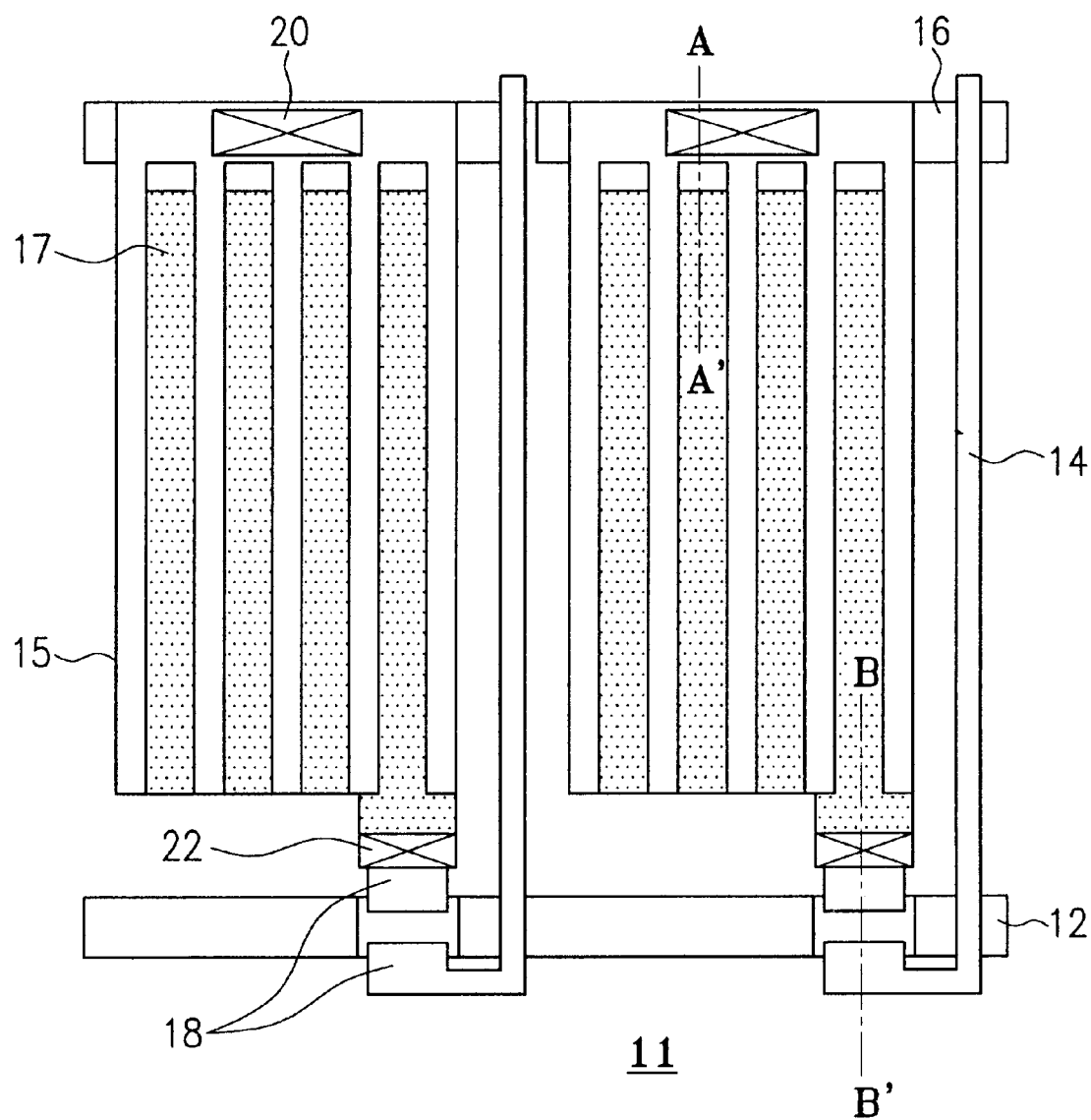
FIGS. 2A and 2B are plan views of a lower substrate of a liquid crystal display device according to a preferred embodiment of the present invention.
Figure 2B:
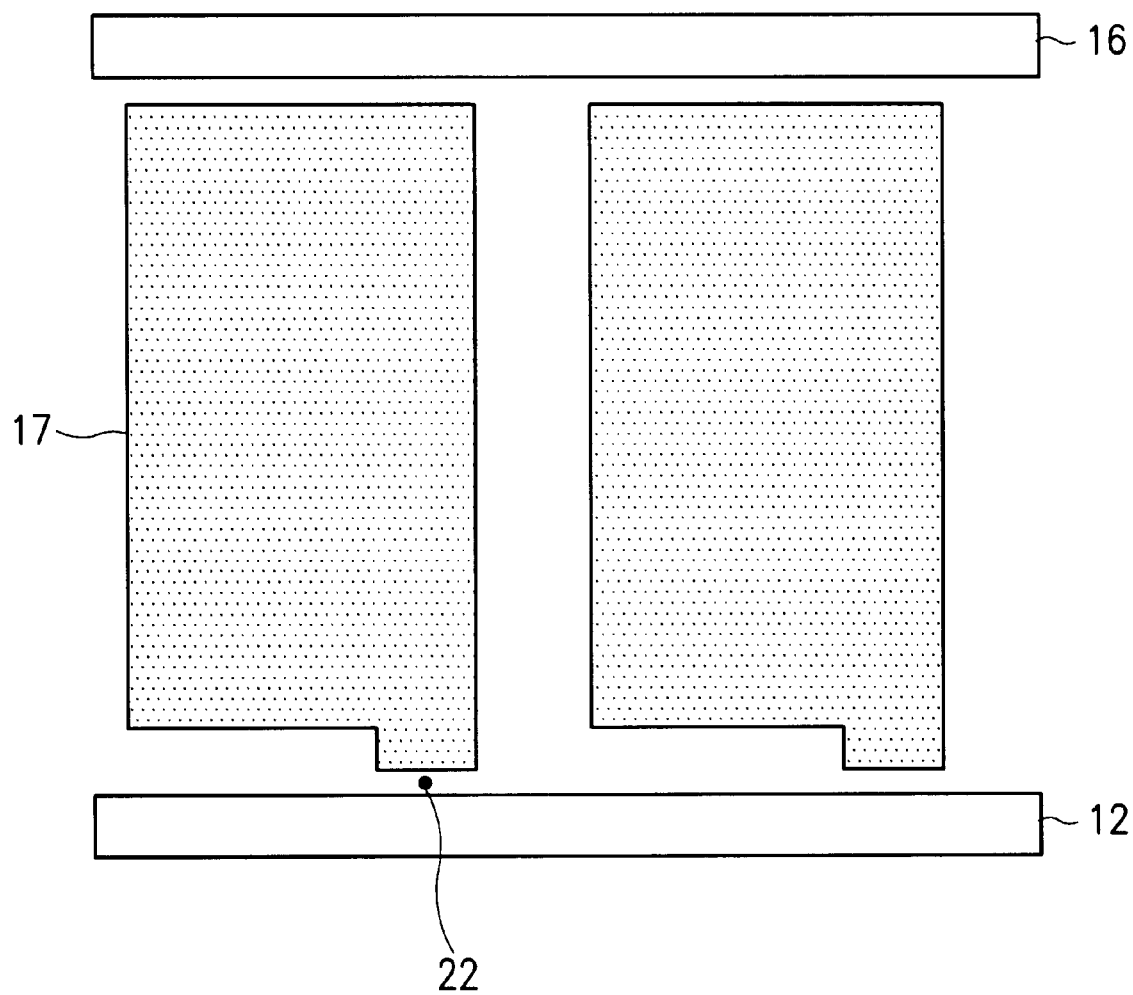

FIGS. 2A and 2B are plan views of a lower substrate of a liquid crystal display device according to an embodiment of the present invention.

Figure 2C:
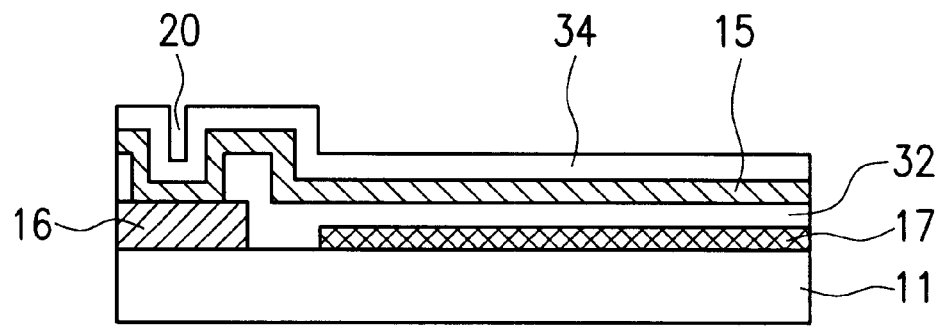
FIG. 2C is a sectional view taken along line A–A' in FIG. 2A.
Figure 2D:
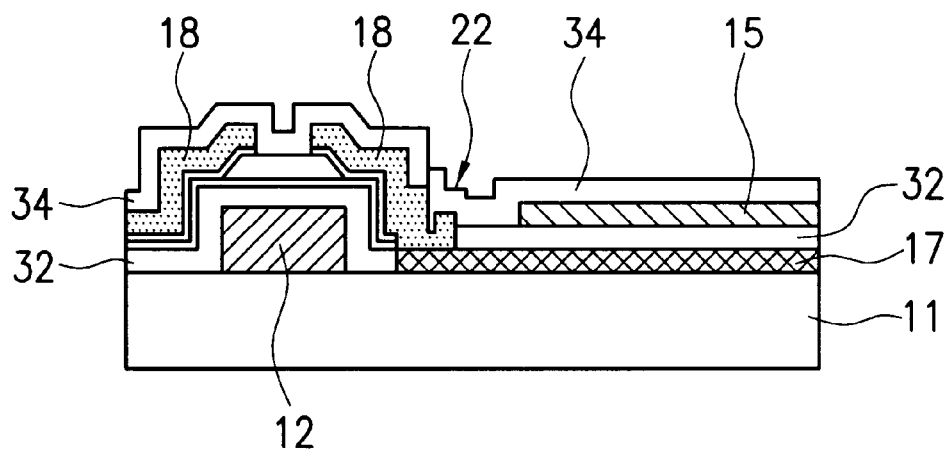
FIG. 2D is a sectional view taken along line B–B' in FIG. 2A.

FIGS. 2C and 2D are sectional views taken along lines A–A' and B–B' in FIG. 2A, respectively.

The liquid crystal display device comprises a plurality of unit pixels formed on a lower substrate 11. Referring to FIG. 2A, each unit pixel includes a pixel electrode 17, a common bus line 16, a gate bus line 12, a counter electrode 15, a data bus line 14 and thin film transistor.

The pixel electrode 17 is formed on the lower substrate 11 by patterning a first transparent electrode and has the shape of a plate as seen from FIG. 2B showing the state that the data bus line 14, the counter electrode 15 and the thin film transistor are removed. A lower end of the pixel electrode 17 protrudes in part so as to be in contact with one terminal of the thin film transistor. The thin film transistor has a source/drain electrode 18.

The common bus line 16 is spaced at a predetermined distance from the pixel electrode 17. At this time, the distance between the common bus line 16 and the pixel electrode 17 is preferably 5 µm.

The gate bus line 12 is formed on the opposite side to the common bus line 16 with regard to the pixel electrode 17.

The counter electrode 15 is formed over tie pixel electrode 17 by using a second transparent electrode and has a plurality of slits tat open to only one side. That is, the counter electrode has a comb-like shape. The gate insulation layer 32 is formed with a first contact hole 20 for connecting the counter electrode 15 to the common bus line 16 as seen from FIG. 2C.

As shown in FIG. 2A, the data bus line 14 intersects with the gate bus line 12 between two pixel electrodes 17 in the adjacent unit pixel. The gate insulating layer 32 is also formed with a second contact hole 22 for connecting the source/drain electrode 18 to the lower pixel electrode 17 as seen from FIG. 2D.

In the liquid crystal display device according to present invention, sizes of the first and the second contact hole are preferably 10×30 µm and 6×20 µm, respectively. Also, a thickness of the pixel electrode is preferably 400 Å.

Further, it is preferred that the data bus line 14 is composed of a laminate of molybdenum (Mo)/aluminum (Al)/molybdenum (Mo).

Now, a description will be given for a method for manufacturing the lower substrate 11 of the liquid crystal display device constructed as the above, with reference to the accompanying drawings.

At first, the pixel electrode 17 is formed by means of patterning of the first transparent electrode (ITO). In this case, the pixel electrode 17 is patterned in the shape of a box and has a thickness of 400 Å.

Thereafter, the gate bus line 12 and the common bus line 16 are formed on the lower substrate 11 by using metal material of an aluminum (Al) series. In this case, the common bus line 16 and the pixel electrode 17 made of the first transparent electrode (ITO) are spaced apart from each other at a predetermined distance (about 5 µm).

Thereafter, a gate insulating film 32 is vapor-deposited and patterned. At this time, the patterning is performed on an upper part of the common bus line 16 and predetermined portions of the pixel electrode 17 made of the first transparent electrode (ITO), and then the counter electrode 15 is formed on the patterned part and portions by using the slit-shaped second transparent electrode (ITO). Next, the contact hole 22 is formed on the pixel electrode 17 in such a manner that the contact hole 22 connects the pixel electrode 17 to the source/drain electrode 18 later on. The size of the contact hole 22 on the pixel electrode 17 is 10×30 µm as mentioned above.

Thereafter, four layers are formed on the gate bus line 12, and then an etch stopper (E/S) and an active layer are formed by patterning.

In the formation of the counter electrode 15 by use of the second transparent electrode (ITO), the second transparent electrode (ITO) is vapor-deposited and patterned. In this case, patterning is so performed as to form a plurality of slits in the counter electrode 15. In addition, the contact hole 20 is formed on the common bus line 16 so that the counter electrode 15 is connected to the common bus line 16 in the lower portion. The size of contact hole 20 on the common bus line 16 is 6×20 μm as mentioned above. When the formation of the contact holes 20, 22 is performed, the insulating film 32 must be removed.

Thereafter, the data bus line 14 and the source/drain electrode 18 are formed by using non-transparent source/drain metal made of a laminate of molybdenum (Mo)/aluminum (Al)/molybdenum (Mo) and having a thickness of 2000 Å. Just then, the source/drain electrode 18 is connected to the lower pixel electrode 17 made of the box-like first transparent electrode (ITO).

Finally, a protective film 34 made of silicon nitride (SiNx) film is coated on the resultant product with a thickness of 2000 Å, patterned and opened for the preparation of an outer leader bonding operation (OLB).

In the liquid crystal display device and its manufacturing method according to the present invention as described above, the existing box-like counter electrode is connected to the source/drain electrode through the contact hole and so is used as the pixel electrode, and the existing slit-shaped pixel electrode is connected to the non-transparent metallic common bus line through the contact hole and so becomes the counter electrode while maintaining the existing process layer structure as it is, so that even if the short circuit occurs between the gate bus line and the box-like pixel electrode in the same layer due to the particle, degradation as the form of a bright pixel defect is limited to only one pixel. As the result of that, the process yield is enhanced. In a size of 15 inches diagonal, degradation containing up to 5 bright pixels is not fatal in view of image quality, which means that increase of the process yield can be expected.

While the present invention has been illustrated and described under considering a preferred specific embodiment thereof, it will be understood by those skilled in the art that the present invention is not limited to this embodiment, and various changes and modifications and equivalents may be made without departing from the scope of the present invention.

What is claimed is:

1. A liquid crystal display device comprising a plurality of unit pixels, each unit pixel comprising:
    a pixel electrode formed on a lower substrate by patterning a first transparent electrode and including a protrusion at an end thereof so as to provide means for contact with one terminal of a thin film transistor;
    a common bus line spaced at a predetermined distance from the pixel electrode;
    a gate bus line formed on the opposite side of the common bus line with regard to the pixel electrode;
    a gate insulating layer patterned to provide at least a first and a second contact holes;
    a counter electrode formed over the pixel electrode by using a slit-shaped second transparent electrode, said second transparent electrode extending through the first contact hole so as to be connected to the common bus line; and
    a data bus line intersecting with the gate bus line between two pixel electrodes in the adjacent unit pixel, the data bus line extending through the second contact hole so as to be connected to the pixel electrode at the protrusion end.

2. A device as claimed in claim 1, wherein the first contact hole has a size of 10×30 μm.

3. A device as claimed in claim 1, wherein the second contact hole has a size of 6×20 μm.

4. A device as claimed in claim 1, wherein the pixel electrode has a thickness of 400 Å.

5. A device as claimed in claim 1, wherein the predetermined distance between the common bus line and the pixel electrode is 5 μm.

6. A device as claimed in claim 1, the data bus line comprises a laminate of molybdenum (Mo)/aluminum (Al)/molybdenum (Mo).

7. A method for manufacturing a liquid crystal display device, the method comprising the steps of:
    forming a pixel electrode on a lower substrate by patterning a first transparent electrode, the pixel having a protrusion at an end thereof so as to provide contact with one terminal of a thin film transistor;
    forming a common bus line spaced at a predetermined distance from the pixel electrode and then forming a gate bus line;
    performing a vapor deposition of a gate insulating film on the gate bus line and then patterning the gate insulating film so as to provide first and second contact holes therein;
    performing a vapor deposition of four layers on the gate bus line and then forming an etch stopper layer and an active layer by patterning;
    forming a counter electrode over the pixel electrode by using a slit-shaped second transparent electrode and then providing extension of the counter electrode through the first contact hole in the gate insulating film to connect the counter electrode with the common bus line;
    forming a data bus line that intersects with the gate bus line, forming a source/drain electrode and then providing extension of the source/drain electrode through the second contact hole in the gate insulating film to connect the source/drain electrode to the protruding end of the pixel electrode; and
    coating a protective film on the resultant product and then opening the protective film by patterning for the preparation of a leader-bonding operation.

* * * * *